INVENTORS
GIFFORD HEFLEY, ROBERT F. LINFIELD
THOMAS L. DAVIS, ROBERT H. DOHERTY

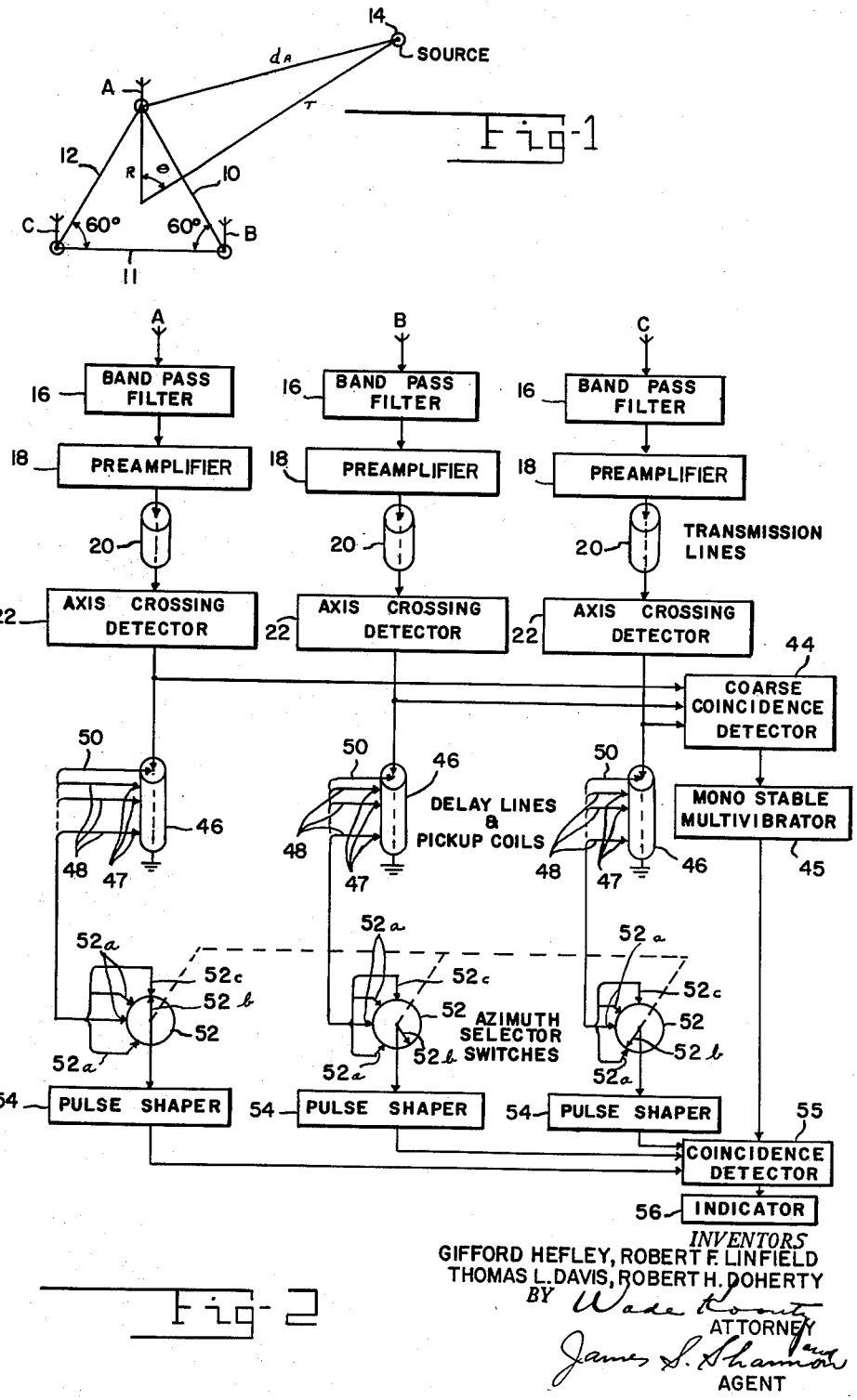

INVENTORS
GIFFORD HEFLEY, ROBERT F. LINFIELD
THOMAS L. DAVIS, ROBERT H. DOERTY 3,106,709
ATMOSPHERICS DIRECTION FINDING SYSTEM
Gifford Hefley, Robert F. Linfield, Thomas L. Davis, and Robert H. Doherty, all of Boulder, Colo., assignors to the United States of America as represented by the Secretary of the Air Force
Filed Feb. 26, 1962, Ser. No. 175,858
4 Claims. (Cl. 343—113)
(Granted under Title 35, U.S. Code (1952), sec. 266)

The invention described herein may be manufactured and used by or for the United States Government for governmental purposes without payment to us of any royalty thereon.

This invention relates to a direction finding system and, particularly, to a direction finding system for locating the bearing of transient signals emitted in areas experiencing thunderstorm activity.

In the field of meterology to which the present invention relates, various methods have been proposed for detecting the bearing of electrical discharges caused by lightning flashes and reasonably accurate information as to the directional location of such disturbances has been provided in the past. Atmospherics studies and experimental efforts have, however, continually emphasized the need for reducing the effects of various error sources which inherently prevent the most favorable interpretation of the energy received. Of the several sources of error found prevalent in atmospherics direction finding systems, two main contributing sources of inaccuracy include siting errors, which are caused by irregular terrain in the vicinity of the observation site, and polarization errors, which result from uneven reception of directly received and ionospherically reflected components of incident waves. Direction finding techniques used heretofore for the location of transient signals of the type generated during atmospherics disturbances have generally employed crossed-loop antennas. The accuracy of such systems has been limited however largely by the siting and polarization errors involved. Other efforts to minimize contributing errors have led to the development of detecting systems employing single and multiple vertical antenna arrangements. In general, it has been found that data obtained from a detection system employing a single antenna station is less accurate for resolving directional tests than equivalent data obtained from an arrangement employing a plurality of antennas. The value of multiple antenna systems toward minimizing error quantities of the type suggested above is recognized in the present invention and, accordingly, this invention has for one of its objects a multiple antenna atmospherics direction finding system in which siting and polarization errors are reduced to measurable values favorably comparing with present standards.

Another object of the invention is to provide an atmospherics direction finding system whose instrumentation permits radial atmospherics detection scanning in a geometric pattern capable of being divided into sectors of variable azimuthal width.

Still another object of the invention is to provide an atmospherics direction finding system in which the differences in the immediate environmental characteristics of the antennas are minimized.

A further object of the invention is to provide an atmospherics direction finding system employing plural antennas arranged in equilateral triangle configuration, wherein the position of a source of atmospherics is determined by predicting the time intervals between the arrival of signals at the respective antennas.

In accordance with the invention, an arrangement to carry out the foregoing objects includes three spaced vertical antennas preferably located at the vertices of an equilateral triangle. The sides of the triangle accordingly define the base lines of three hyperbolic grids with a mutual azimuth spacing of 120°. The occurrence of electrical disturbances in the atmosphere is recognized by transient signals at each antenna, and the arrival times of the respective signals are determined to afford precise selection of the first three signals received. A complete set of signals is applied to a coarse incidence detector which generates a pulse which signifies a completed selection. The width of the coarse coincidence detector pulse is proportional to the base line spacing of the antennas. For finding the direction of a source of atmospherics, an azimuth designated as the bearing intended to be scanned for atmospherics is selected in advance. Simultaneously with supplying the input signals to the coarse coincidence detector, these signals are directed to a variable delay network. There the signals received at those antennas which are nearer than any one of the other antennas to an atmospherics source aligned directionally with the predefined azimuth are delayed by a predetermined interval which ends when the signal to the antenna most distant from the source arrives. The beginning and therefore the length of the delay intervals will necessarily depend on the respective distances separating the nearest antennas and the source and will vary as the particular azimuth to be scanned is changed. After the appropriate delay of the early signals is introduced, the delayed and undelayed signals are converted to rectangular pulses. The width of each pulse is the same and may uniformly be varied so that the width of the sector in which atmospherics signals must originate in order to produce a sector identification response varies according to the pulse width. To test time coincidence of the rectangular pulses and the pulse generated by the coarse coincidence detector, a second coincidence circuit is employed. In those cases, and only those cases, where atmospherics signals appear in the sector defined by the azimuth specified, a coincidence of the four input pulses will result and a final signal confirming the directional origin of the atmospherics is generated as the system's output.

A complete understanding of the invention and an introduction to other objects and features not specifically mentioned may be had from the following detailed description of a specific embodiment thereof when read in connection with the appended drawings, in which like reference characters refer to like elements in each of the several views, and wherein:

FIG. 1 shows the preferred geometrical arrangement of the antennas employed in the direction finding system of the present invention;

FIG. 2 diagrammatically illustrates in block diagram form one embodiment of the atmospherics direction finding system constructed according to the present invention;

Figure 5:
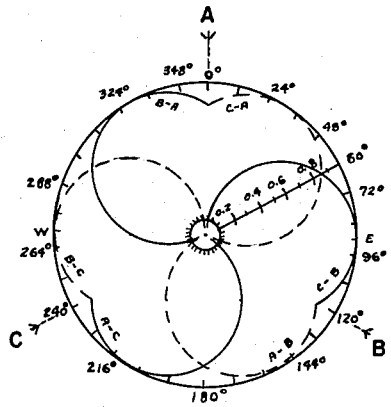
Figure 6:
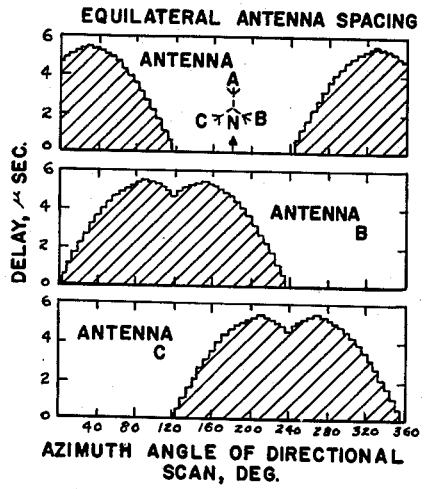
Figure 7:
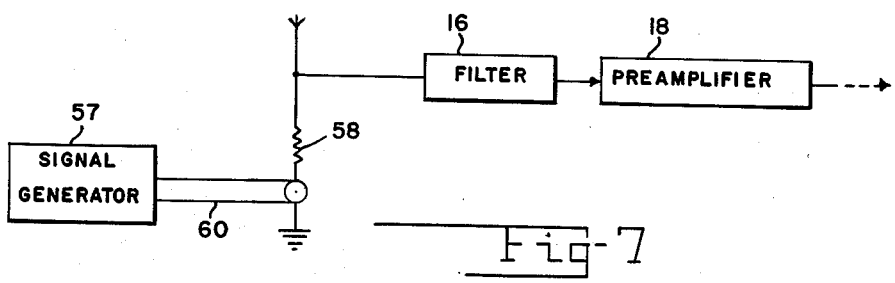

FIG. 5 describes a polar diagram of the antenna arrangement adopted for the present invention;

FIG. 6 shows in graphic form the delay intervals imposed on signals at the respective antennas for each azimuthal angle over the full scanning range; and, FIG. 7 illustrates one method of calibrating the respective receiving channels employed in the direction finding system of the present invention.

Referring now to FIG. 1, which shows the geometrical configuration on which the system of the invention is based, spaced vertical antennas identified by the reference characters A, B, and C, are located at the vertices of an equilateral triangle. The sides of the triangle 10, 11, and 12 accordingly define the base lines of three hyperbolic grids having a mutual azimuthal spacing of 120°. The antennas are closely spaced, preferably in the range of ⅓ to 1/10 wavelength at approximately 10 kc. This frequency as is known, is the frequency at which maximum energy is radiated during a lightning flash and, as will be seen, the system of the invention is adapted for the reception of atmospherics energy at this frequency. Considering the propagation velocity of radio energy and the preferred spacing of the antennas, the relative arrival times at the antennas of transient signals emitted by a source of atmospherics depends upon the geometric configuration of the antennas and the direction of the signal source. In the triangular detecting system of FIG. 1, controlling geometric principles may be understood conveniently by assuming the existence of a source 14 shown being separated from the location of antenna A by a distance $d_A$. The distance between source 14 and the center of the triangular configuration is labeled $r$. The distance separating each of the antennas from the triangle center is located by the letter R. From the specified antenna configuration, the definitions illustrated by the equations below apply:

$$d_A = \sqrt{R^2 + r^2 - 2rR \cos \theta} \quad (1)$$
$$d_B = \sqrt{R^2 + r^2 - 2rR \cos (120-\theta)} \quad (2)$$
$$d_C = \sqrt{R^2 + r^2 - 2rR \cos (120+\theta)} \quad (3)$$

It can also be shown that the differences in the time of arrival of signals at the antennas are proportional to the differences in the distance between each pair of antennas relative to the source, as defined by the following equations:

$$(d_B - d_A)k = T_{B-A} \quad (4)$$
$$(d_C - d_B)k = T_{C-B} \quad (5)$$
$$(d_C - d_A)k = T_{C-A} \quad (6)$$

where the constant $k$ is proportional to 5.37 microseconds per statute mile, the inverse velocity of radio wave propagation near the surface of the earth.

Since the antennas are spaced from each other by only a small fraction of the wavelength of energy radiated during a lightning flash, the differences in arrival times of signals at the antennas will be small. Therefore, it is necessary to resolve these differences rather precisely in order to provide satisfactory azimuthal sensitivity of the sources detected. A reference to FIG. 2 will show the means employed to accomplish this resolution and the techniques fundamental to the invention by which the direction of transient signals emitted from a point source of atmospherics is determined.

Considering now the functional system diagram of FIG. 2, antennas A, B, and C, noted previously as being at the vertices of an equilateral triangle in an idealized system, are responsive to the arrival of atmospherics signals and are coupled to identical bandpass filters 16 tuned to a frequency in the region of 10 kc. Although in practice compromises will undoubtedly be required in almost every installation of detection equipment characterized by the invention, and standards adopted in the present invention may not apply in other selections, antennas which have been used in a successful application of the invention were in height approximately 125 feet with their measured capacity being approximately 515 µµf. When an antenna of these proportions is used, the presence of persons or objects near the base of the antenna has very little or practically negligible effect on its electrical characteristics. Moreover, by virtue of the large effective height, very loose couplings can be used between the output stages of the antennas and the inputs of succeeding stages without regarding the overall noise figure of the receiving system.

Atmospheric signals received at the antennas and passed by the filters 16 are applied to preamplifiers 18 located, in the preferred practical arrangement, at the base of each antenna. The desirable qualifications for the preamplifiers are large dynamic range because of the widely varying amplitudes of transient signals and high power which is essential to insure a good signal-to-noise ratio at the preamplifier outputs. Signals supplied by the preamplifiers 18 are directed to identical transmission lines 20 which are so adjusted that their transmission times are equal. In FIG. 2 that portion of the equipment illustrated below the transmission lines will ordinarily be located at a central control station. The transmission lines 20 have purposely been shown in diagrammatic fashion but, when coaxial cables for the transmission lines are used, such cable is not perfectly shielded and is, therefore, subject to pickup from adjacent power lines. Optimum reception and resolution of transient signals are also endangered by small voltages induced in the transmission lines by the same transient signals received by the antennas. The necessity of maximum shielding is therefore obvious in order to insure that the effect of undesired spurious signals is made negligible compared to the strength of atmospherics signals intercepting the antennas.

Figure 4:
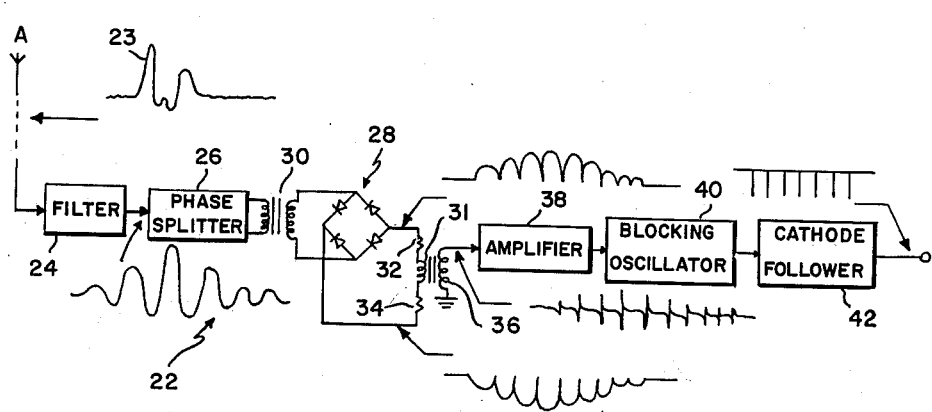
FIG. 4 is a detailed showing of one form of axis crossing detector employed in the system shown in FIG. 2.

Transient signals applied through the transmission lines in each channel are fed to identical axis crossing detectors designated 22. These detectors determine the first axis crossing of detectable amplitude of transient signals at each antenna whereby the arrival times of the signals at the respective antennas are defined. One type of axis crossing detector 22 proposed for use in the present invention is shown in FIG. 4 wherein an antenna, arbitrarily labeled A, is shown receiving a transient signal 23 from an atmospherics source. The filtering which is done in part at the band pass filters 16 at the antennas is completed at a second filter 24 which produces a sinusoidal waveform generally of the nature shown. This waveform is applied to a phase splitter 26 coupled to a full wave rectifier 28 by means of a transformer 30 so that two output signals 180° removed in phase and of equal amplitude are produced at the output terminals of rectifier 28 as a result of the single sinusoidal input to phase splitter 26. A second transformer whose primary winding designated 31 is connected in series with resistors 32 and 34 converts the out-of-phase rectifier outputs to a train of positive and negative signal pulses appearing across the secondary winding 36. This pulse train is amplified by an amplifier 38 and is applied through a blocking oscillator 40 to a cathode follower output stage 42. The output of cathode follower 42 is a train of negatively referenced narrow pulses each of which signifies the arrival time of a transient atmospherics signal incident on the antenna. Thus, for each input signal to the axis crossing detector, the first axis crossing of the waveform developed as the input to the phase splitter 26 is relied on to define a precise point in time which is independent of the amplitude of the signal. As a result, substantially at each instant of an axis crossing a short trigger, shown by the successive outputs of cathode follower 42, is generated.

The pulse train developed by each axis crossing detector 22 is directed over duplicate paths one of which leads to a coarse coincidence detector identified by the reference character 44. As a general description of the function of the coarse coincidence detector, here the first complete set of three trigger pulses present in the pulse trains supplied by the respective axis crossing detectors are selected. A coarse coincidence detector contemplated for use in the present invention may be the conventional AND circuit to which two or more inputs may be applied, and in which a single output is provided if, and only if, a pulse is applied simultaneously to all inputs. The selectivity of the coarse coincidence detector in the illustrated embodiment is made sufficiently broad such that in all cases in which a complete set of axis crossing triggers is supplied by the axis crossing detectors an output pulse will be generated. In other words, the time duration of the first three triggers appearing on the respective output terminals of the axis crossing detectors will always be such that conditions will be met in the coarse coincidence detector to produce a time coincidence output pulse.

The coincidence pulse generated by the coarse coincidence detector 44 is fed to a monostable multivibrator 45 adapted to generate a gate pulse having a width proportional to the maximum difference in the time of arrival of signals at the antennas. This maximum time difference required for the detecting system of the invention is determined by the base line length, as may be seen by reference to Equations 4, 5, or 6. It has been found that completely acceptable operation may be attained by employing a multivibrator having a pulse width of 3 microseconds for each kilometer of base line. An additional microsecond may be added to further insure correct operation; however, a full time supplement of one microsecond is not a compulsory measure and suitable fractional portions thereof may instead be added without jeopardizing the attainment of optimum results. The total width of the output pulse of multivibrator 45, presuming the above requirements, is then on the order of:

$$T = 3d + 1 \; (\mu\text{sec.})$$

where $d$ is the base line (antenna-to-antenna) spacing in kilometers. By making the duration of the pulse emitted by multivibrator 45 greater than the maximum time difference, the coarse coincidence detection is, therefore, not a function of azimuth. Once the width of the pulse representing the coarse coincidence gate has been determined, appropriate constants in multivibrator 45 to insure the necessary pulse width are established.

Figure 3:
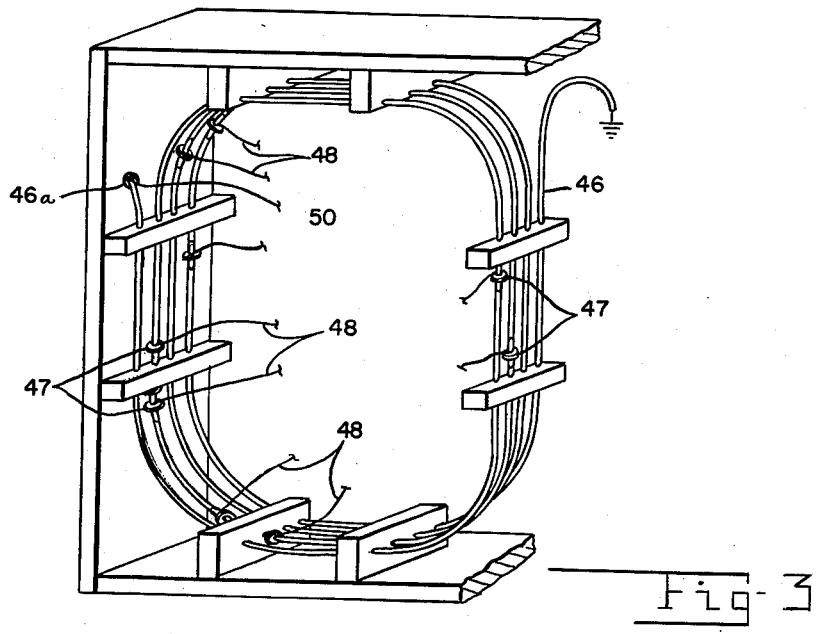
FIG. 3 shows a portion of a time delay network as used in the invention to delay incoming atmospherics signals.

The triggers supplied by the axis crossing detectors which mark the axis crossings are fed into three identical delay lines 46 shown functionally in FIG. 2 and assumed to be lossless for simplicity in the following discussion. An actual construction of the form that the delay lines may take in a practical embodiment as applied to the present invention is shown in FIG. 3. There one end of a delay line 46 is connected with a reflection-free termination to ground, while the opposite end is terminated at 46a for connection to the output lead of the axis crossing detector which supplies it with its input signal. Delay line 46 preferably is of the distributed constant, magnetic core type, which is available commercially in a wide range of delay and bandwidth characteristics. A plurality of pickup coils 47, each having an output wire 48, are removably attached to delay line 46 and are adapted to be moved along the delay line in either direction. As a pulse propagates above the delay line a signal is induced in each pickup coil when the pulse passes. The pickup coils are placed at desired points along the delay line to achieve any required number of delay intervals and, within practical limits, as many pickup coils as desired may be used on the same delay line because of the very loose coupling between the coils and the line. The pickup coils 47 are represented in FIG. 2 by a plurality of taps conventionally shown in arrow form. In addition to the output wires 48 extending from the pickup coils, a time delay of zero magnitude is developed by the use of a single wire 50 connected to the input end of each delay line, which wire likewise is illustrated in FIG. 2.

To utilize the energy induced into the pickup coils, the opposite ends of the lines 48 for each particular channel are connected selectively to fixed angularly-spaced terminals 52a of an azimuth selector switch 52, shown herein as comprising a three-section radial switch having ganged selector arms 52b rotatable throughout 360° of azimuth. Connections also exist in each channel between the zero delay wire 50 and an additional terminal 52c on each section of switch 52. It will be appreciated that a signal arriving at the input end of each delay line operates on each of the pickup coils to achieve a number of delay intervals equal to the number of pickup coils employed. For the case in which the selector arm 52b is placed into contact with terminal 52c, the pulse received by the particular selector arm will occur at a definite time simultaneous with the input pulse to the delay line so that zero delay of the input pulse is achieved. In accordance with the principal objects of the invention, appropriate placement of the selector arms in each section of switch 52 is accomplished by selecting in advance the azimuthal angle which it is desired to scan for atmospherics activity. Hence, the center of the sector scanned is defined by the azimuth selected. Based on the assigned azimuth, the selector arms of azimuth selector switch 52 are adjusted accordingly so that signals appearing at the selector arms are arranged in a time relationship governed by the azimuth selected. As will be seen hereinbelow, a response indicating the occurrence of atmospherics agitation will occur when and only when atmospherics signals arrive at the antennas from a direction coincident with the predefined azimuth.

The method of preselecting delay intervals corresponding to the azimuth it is desired to scan can be approached most conveniently by considering the diagrams of FIGS. 5 and 6. In FIG. 5 a polar plot, defined in meterology usage as describing the receiving pattern of an antenna system, is shown normalized to a unit maximum radius and conforming to the equilateral triangle arrangement deemed desirable in the present invention. Since the detecting system of the invention is a ground installation, reference for any azimuthal lines projected during a bearing selection is made to true North or zero degrees. In any application of the invention to a practical detecting system, FIG. 6 fully illustrates the manner in which delay intervals are introduced to each signal passing through the delay lines. In FIG. 6, a delay pattern for each antenna is represented separately by a curve which describes the delay values (microseconds) required for azimuthal switching over the full scanning range of 360°. The delay patterns for antennas A, B, and C are shown in the upper, middle and lower curves of FIG. 6, respectively. For signals incident on antenna A, the delay values are reduced to zero during the azimuthal sector of 120 to 240 degrees and, as seen, delay increments are imposed on signals reaching antenna A when the selected azimuth is directed between the angular limits of 0 to 120 degrees and 240 to 360 degrees. A similar analysis extended to the middle and lower curves of FIG. 6 shows during what portions of a complete azimuthal revolution signals incident on antennas B and C will and will not be delayed. Taking one specific example as an illustration, let us assume that it is desired to scan the area due North of the antenna installation for the presence of atmospherics signals; that is, zero degrees is selected in advance as the azimuth along which the atmospherics investigation will be conducted. In the chosen example, antenna A is the antenna nearest to any atmospherics source coinciding directionally with the assigned azimuth. At the same time, antennas B and C are equidistant from the hypothetical source. By referring to FIG. 6, it can be seen that the amount of delay imposed on signals incident on antenna A from such a source would be approximately 4.5 $\mu$s. and that signals emitted by the same source would receive no delay in the channels entered through antennas B and C. At a selected bearing scan of 120°, the amount of delay to signals incident on antenna B will equal the delay inserted for the former case of scanning along the zero degree line whereas, for signals received by antennas A and C, no delay interval is required. Similar observations may be made for the case concerning the anticipated reception of signals from a heading of 240°, where it can be seen that atmospherics signals incident only on antenna C will be delayed. Closer scrutiny of the curves describing the delay characteristics of each channel will reveal, moreover, that for any azimuth selection incoming atmospherics signals emitted by a source directionally aligned with the assigned azimuth will be delayed by the prescribed amount only on those of the antennas which are closer than any one of the other antennas to the emitting source. From this assumption, validated by the curves of FIG. 6, it will therefore be understood that for all cases except those in which the preselected azimuth is established at either 0, 120, or 240 degrees, signals passing through no less than two of the channels will be subjected to a delay interval.

As pointed out previously, the number of pickup coils on the delay line connected in each channel determines the number of delay intervals available. In the present invention, one expedient found practical in actual usage is to position the pickup coils along each delay line in such manner as to obtain 6° increments of azimuth switching. Due to the step profile of the curves illustrated in FIG. 6, each 6° interval of azimuth may clearly be distinguished from the next. It will be noted that the curves in FIG. 6 representing the required delay as a function of azimuth though nonlinear are symmetrical about center bisectors having a mutual azimuth spacing of 120°. Thus, in the zone for each antenna in which a delay to atmospherics signals is mandatory, it can be seen that two azimuth selection points exists on each curve at which the value of delay intervals required are equal. It follows, therefore, that to obtain the required number of azimuth increments of 6° in a practical embodiment of the invention, a minimum number of fifteen pickup coils on each delay line is required. That is, as shown in FIG. 6, each graph repeats itself in such a manner that only fifteen different delays are required for the twenty positions shown. Double utilization of the delay obtainable from each pickup coil thus necessarily involves appropriate internal circuit connections at terminals 52a of the multiple sections of switch 52, whereby, in a manner believed apparent, the capacity of each pickup coil to supply the same delay interval for two angularly spaced azimuth selections would be observed. The choice of utilizing incremental steps of 6° for azimuth switching is, moreover, not intended as a limitation to the invention since variations to change the accuracy of detecting atmospherics targets are possible by adding or subtracting to the number of pickup coils on each delay line whereby the increment of azimuthal switching would become smaller and larger, respectively.

From the description thus far it will be recognized that signals transferred to selector arms 52b of the respective sectors of the azimuth selector switch 52 are delayed a prescribed amount, or not delayed at all, in accordance with the selected azimuth, so that a preselected time difference between the various signals exists upon their departure from the sections of switch 52. The delayed and undelayed signals are applied to pulse shapers 54 (FIG. 2) which may be a conventional monostable multivibrator similar to that described hereinabove in connection with multivibrator 45. In the pulse shapers 54 the input signals undergo no change as to their time relationship but are regenerated in the form of substantially rectangular pulses of identical width. The width of each pulse is determined from the width of the sector desired for each selected azimuth, and the width is established through suitable selection of circuit constants in each pulse shaper. Hence, the width of each pulse supplied by the pulse shapers 54 is directly proportional to the number of degrees on either side of the selected azimuth from which atmospherics signals must arrive in order to register the presence of atmospherics in the region defined by the selected azimuth.

The width of the pulses generated by the pulse shapers 54 is directly related to the base line length of the antenna configuration. For example, a sector width of 1° requires a pulse width of approximately 0.05 μs. when a one mile base line is used, but the same sector width can be obtained with a 0.25 μs. pulse if a five mile base line is used. The less critical time interval required by a system employing a longer base line is obvious from an instrumentation standpoint. Actual pulse widths adjustable from approximately 0.2 to 7.0 μs. in an experimental system using a four mile base line resulted in a choice of sector widths ranging from approximately 1 to 40°. It should be noted, however, that the linear relationship between sector width and the width of pulses produced by the pulse shapers holds only for relatively small sector widths, less than about 12°, and to avoid nonlinear effects sector widths less than 12° are considered desirable.

The rectangular waveforms produced by the pulse shapers 54 are applied to a second coincidence detector 55 having a fourth input which is the variable width coarse coincidence pulse generated in the multivibrator 45. Coincidence detector 55 may comprise a conventional AND circuit capable of nonlinear addition. The pulses derived from the pulse shapers 54 are of the same length but, as previously mentioned, the time relationship of these pulses differs so that an output pulse will appear from coincidence detector 55 only during the interval that the pulses from the pulse shapers 54 and the pulse from the multivibrator 45 are in time coincidence. The length of the pulse from multivibrator 45 is considerably larger than either of the pulse widths supplied by the pulse shapers 54 so that a time coincidence in coincidence detector 55 depends mainly on the time relationship of the delayed and undelayed pulses. An indicator 56 coupled to the output of coincidence detector 55 displays an indication of coincidence when the four inputs to coincidence detector 55 occur simultaneously. Thus, in the system of the present invention, the transient signals received by the antennas A, B, and C are selectively delayed by predetermined amounts determined by the azimuth to be investigated for the occurrence of atmospherics disturbances, and a quadruple coincidence in coincidence detector 55, resulting in an excitation of indicator 56 will occur when and only when signals arrive from that area and that area only aligned directionally with the preselected azimuth.

In a broad sense, a uniquely different aspect of the invention which amounts to a considerable departure from detecting techniques of prior art systems is that the relative arrival times of signals from a selected number of directions are anticipated beforehand rather than measured after the arrival of incident energy. The delay intervals prescribed in each channel for each selected azimuth thus amount to finite tolerances that govern the operation of the system so that the arrival of atmospherics signals is detected only when signals originate at only those sources which are in a sector whose width is governed by the tolerances. Signals incident on the antennas and generated by atmospherics sources located in sectors outside the sector defined by the selected azimuth will be delayed by intervals which do not meet the definition of a coincidence. Thus, with the arrangement of the present invention, the instant of quadruple coincidence in coincidence detector 55 indicates that a remotely located source of atmospherics signals exists in the area coinciding directionally with the advance-selected azimuth.

In an experimental system whose units and organization conform with the invention as hereinabove set forth, the delay intervals as controlled by the sections of azimuth selector switch 52 were computed for a 5,000-mile range. However, it can not be ignored that the use of one set of delays for all ranges develops a source of inaccuracy. Any bearing errors which develop from the choice of a particular maximum range may amount to several degrees for sources of atmospherics only a base line length away from the location of the antenna. For distances greater than about ten base line lengths away from the antennas, the error in bearing becomes so small that it may be neglected without significantly affecting the accuracy of the system. Therefore, in deciding for which range the delays should be computed, simplifications may be effected by assuming that the origin of atmospherics towards which interest will be directed during the detection function is at a great distance from the area in which the antennas are located.

It will be recognized that the circuit units in the three channels leading from the antennas to the inputs of coincidence detector 55 are critical with respect to phase and time delays. While attempts should be made to make each channel as nearly identical as possible to the others, each channel is provided with a separate phasing adjustment so arranged that the overall transmission times of the respective channels, independent of the delay intervals introduced, can be made equal. To complete the phasing adjustments, a pulse signal generator 57 (FIG. 7) covering the signal frequency range, is connected to each antenna through a resistor 58. Each connection is made through a coaxial cable 60 of identical electrical length. During calibration, the signal generators 57 inject signals into each of the antennas and the condition created is equivalent to the occurrence of signals on the perpendicular bisectors of the three base lines defined by the antennas. The appearance of the signal generator pulses on the antennas thus defines six headings at a mutual spacing of 60° at which the different pairs of pulses at the input to the coincidence detector 55 must be coincident. This condition of coincidence is achieved by properly adjusting the phase conditions of the signals delivered by the test oscillators.

Although only one embodiment of the invention has been illustrated and described, it will be apparent to those skilled in the art that various changes and modifications may be made therein without departing from the spirit of the invention or the scope of the appended claims.

We claim:

1. An atmospherics detecting system comprising, a triangular configuration of equilaterally spaced receiving antennas, coarse coincidence detecting means coupled to said antennas and receiving the first complete set of signals incident on said antennas for generating a coarse coincidence pulse when the selection of the set is completed, means simultaneously responsive to energy incident on said antennas and adjusted in accordance with a predefined azimuth for delaying by a preset interval the arrival times of signals on those of the antennas which are nearer than any one of the other antennas to an atmospherics source directionally aligned with the prescribed azimuth, and other coincidence detecting means receiving the delayed and undelayed signals and the pulse from said coarse coincidence detecting means for confirming reception of atmospherics signals from the direction of said prescribed azimuth when and only when a quadruple time coincidence of the input signals thereto occurs.

2. An atmospherics detecting system comprising, a triangular configuration of three receiving antennas equilaterally spaced a unit base line distance, plural phase differentiating means each coupled to one of said antennas for generating a set of signals having a mutual time relationship determined by the arrival sequence of atmospherics signals at said antennas coarse coincidence detecting means responsive to the first complete set of said signals for producing a coarse coincidence pulse having a width proportional to the unit base line spacing of said antennas, said coarse coincidence pulse being slightly greater in width than the maximum difference between the arrival times of signals at any two of said antennas emitted by the same source, delay network means simultaneously responsive to the first complete set of said signals and adjusted in accordance with a predefined azimuth for delaying by a preset interval the signals incident on those of the antennas which are nearer than any one of the other antennas to an atmospherics source directionally aligned with the prescribed azimuth, pulse shaping means for converting the delayed and undelayed signals supplied by said delay network means to substantially rectangular pulses whose width determines the sector on either side of the selected azimuth in which signals must originate in order to produce a sector identification response, and other coincidence detecting means receiving said pulses from said pulsing shaping means and said coarse coincidence pulse for confirming the reception of atmospherics signals from the direction of said prescribed azimuth when and only when a time coincidence of the input pulses thereto occurs.

3. In an atmospherics direction finding system including three receiving antennas situated at the vertices of an equilateral triangle, means for determining the directional position of an atmospherics source comprising, filter means connected to each antenna and having a bandwidth to accept energy radiated during a lightning flash for producing sinusoidal waveforms representing atmospherics signals incident on said antennas, plural phase differentiating means each receiving one of said sinusoidal waveforms for producing triggers defining the time relationship of the arrivals of said received signals, coarse coincidence detecting means responsive to the triggers from said respective phase differentiating means for producing a coarse coincidence pulse whose width is slightly greater than the maximum difference between the arrival time of signals at any two of said antennas from a source of atmospherics, delay network means receiving simultaneously said time related triggers for delaying predetermined ones of said triggers for intervals defined by a selected azimuth specified as the bearing to be scanned, pulse shaping means connected to said delay network means for converting the delayed and undelayed triggers to pulses of substantially identical width, and other coincidence detecting means receiving the pulses from said pulse shaping means and said coarse coincidence pulse for indicating the presence of atmospherics signals in the sector defined by the selected azimuth when and only when the input pulses applied thereto are in time coincidence.

4. In combination with three receiving antennas situated substantially in an equilateral triangle pattern, means for detecting the direction of sources of atmospherics energy comprising, a filter coupled to each antenna and tuned to the bandwidth of atmospherics energy so as to produce a sinusoidal waveform representing signals incident on said antennas, phase differentiating means coupled to each of said filters for producing time related triggers in accordance with the arrival sequence of signals incident on said antennas, a coarse coincidence detector having plural inputs each receiving one of said triggers and having a pulse output whose width in microseconds is on the order of $3d+1$ where $d$ is the base line (antenna-to-antenna) spacing in kilometers, identical delay circuits each receiving one of such triggers for delaying predetermined ones of said triggers by an amount dependent on an azimuth selected to represent the bearing under investigation for the presence of atmospherics energy, plural pulse shapers receiving the delayed and undelayed triggers from said delay circuits and regenerating them with uniform widths which widths establish the sector on either side of the selected azimuth in which atmospherics signals must originate for an atmospherics detection response to materialize, and means for nonlinearly adding the regenerated pulses from said pulse shapers and the pulse output of said coarse coincidence detector whereby when all four of the input pulses occur simultaneously in time an indication signifying the occurrence of atmospherics disturbances in the established sector is generated.

References Cited in the file of this patent

UNITED STATES PATENTS

| | | |
|---|---|---|
| 2,786,193 | Rich | Mar. 19, 1957 |
| 2,897,351 | Melton | July 28, 1959 |
| 2,943,322 | Asbury | June 28, 1960 |
| 2,962,714 | Meixell et al. | Nov. 29, 1960 |